United States Patent [19]

Pshtissky et al.

[11] Patent Number: 4,994,916
[45] Date of Patent: Feb. 19, 1991

[54] APPARATUS AND METHOD FOR ENCODING IDENTIFICATION INFORMATION FOR MULTIPLE ASYNCHRONOUS VIDEO SIGNAL SOURCES

[76] Inventors: Yacov Pshtissky, 1 Bayclub Dr., New York, N.Y. 11360; Shiyang Gao, 185 California Ave., Uniondale, N.Y. 11553

[21] Appl. No.: 236,457

[22] Filed: Aug. 25, 1988

[51] Int. Cl.⁵ ...................... H04N 5/76; H04N 5/262
[52] U.S. Cl. ................................. 358/181; 358/108; 358/339; 358/142; 358/147; 360/18; 360/33.1
[58] Field of Search ............... 358/108, 141, 142, 146, 358/147, 181, 339, 343, 133, 134; 360/18, 19.1, 24, 9.1, 33.1, 35.1

[56] References Cited

U.S. PATENT DOCUMENTS

| | | | |
|---|---|---|---|
| 3,686,434 | 8/1972 | Lemelson | 358/108 X |
| 3,811,008 | 5/1974 | Lee | 358/335 |
| 4,001,881 | 1/1977 | Folsom | 360/35.1 |
| 4,051,524 | 9/1977 | Baxter | 358/108 |
| 4,198,656 | 4/1980 | Mathisen | 358/108 |
| 4,507,683 | 3/1985 | Griesshaber et al. | 358/181 X |
| 4,511,886 | 4/1985 | Rodriguez | 358/181 X |
| 4,689,661 | 8/1987 | Barberi et al. | 358/142 X |
| 4,764,812 | 8/1988 | Hamley | 358/181 |
| 4,789,894 | 12/1988 | Cooper | 358/335 X |

Primary Examiner—Howard W. Britton
Assistant Examiner—Mark R. Powell

[57] ABSTRACT

Apparatus for encoding identification information onto video signals provided by a plurality of video signal sources (cameras) comprises a switching arrangement for supplying, in sequence, a plurality of independent video signals, each from one of the video sources. An A/D converter converts signal components associated with single field intervals to digital representations and the digital representations are stored in digital memory banks. The memory banks can be divided into two separate halves, each capable of storing a single field of video signals. The memory banks are enabled by a head switching (frame rate) signal from an associated VCR so as to alternately store a single field of video in one half while reading out twice in succession from the other half video signals stored during a preceding frame interval. An encoder adds identification information to the video signals which are read out so as to distinguish those signals from the signals provided from other video sources.

32 Claims, 10 Drawing Sheets

APPARATUS AND METHOD FOR ENCODING IDENTIFICATION INFORMATION FOR MULTIPLE ASYNCHRONOUS VIDEO SIGNAL SOURCES

This invention relates to the encoding and decoding of identification information in connection with video signals originating from multiple sources and, in particular, to the use of such encoding and decoding in the recording and recovery of video information in television surveillance systems employing a plurality of video signal sources (e.g. cameras) which are not synchronized to a common time base.

BACKGROUND OF THE INVENTION

In closed circuit television (CCTV) systems used for surveillance or scene monitoring purposes, it is known to employ a plurality of television cameras, each of which is directed at a different scene. These scenes may be recorded making use of individual video recorders coupled to each camera output, the scenes then being available for review from the associated recorders. Such systems are generally unduly expensive for many installations.

In our prior U.S. Patent Application Ser. No. 099,148, filed Sept. 18, 1987, a system is described which is arranged to electronically encode identification information relative to each specific camera (video signal) source on the "back porch" of the vertical synchronizing portion of the associated video signal Thereafter, the video signals representing a predetermined plurality of image frames from each of the identified sources are recorded in a time-shared or sequential arrangement by a single video recorder on, for example, a single video tape.

The encoded identification information is used to recover and play back the multi-frame video signals from an individual, selected camera as recorded by the single recorder. Such arrangements are particularly cost effective both in terms of equipment usage and in use of recording media (tape).

In order to provide a continuous, stable display of the output previously recorded on the tape from a given camera, a storage type of display device such as a frame freeze monitor or the like is used. The frame freeze monitor is updated or refreshed whenever the next recording of the video signal from the selected camera (source) appears at the play back station of the video recorder If all of the video sources and the video recorder are synchronized to a common synchronizing signal source, the displayed image will be relatively stable and jitter-free over a period in which the monitor image is refreshed a number of times. Similarly, switching the monitor to display the output from different video sources will not result in an undesirable period of rolling or tearing of the image when a change occurs.

A particularly desirable operating mode for such systems is one in which only a single frame (two fields) or even a single field is recorded from each video source during a given surveillance cycle. In the case of single frame recording, two fields (a full image) are recorded from camera #1, the video recorder is then switched during a vertical synchronizing interval to the output from camera #2, the two field-one frame signal from camera #2 is recorded adjacent that from camera #1 on the video tape and so on. Such an arrangement conserves the recording tape and is suitable where all of the video sources and the recorder are operating synchronously (i.e., all are locked to the same synchronizing signals).

However, the foregoing desired results are not obtained in such a system without relatively closely locked and substantially similar video sources. If one or more of the video sources (cameras) is operating asynchronously, it may happen that the output from that source will result in recording of a portion of one image field, followed by a full field and then the remaining portion of another field during a time interval corresponding to the frame interval of the recorder. In another condition, even if each of two adjacent sets of recorded video information represent full frames from each of two sequential video sources, retrieval of two adjacent fields from the video recorder may, in fact, result in the combining of one field from one camera with one field from the next camera, thereby producing two superimposed images rather than a single interlaced image. Such a result is unacceptable.

In the foregoing type of arrangement (i.e. one video recorder and a plurality of video signal sources), improvements in versatility may be realized if the plurality of video signal sources and the video recorder can be operated without any common synchronization or locking together of the time base information utilized in the several devices.

BRIEF DESCRIPTION OF THE INVENTION

In accordance with one aspect of the present invention, an encoding arrangement for providing identification information for video signals originating from a multiplicity of individual video signal sources comprises switching means for providing, in sequence, a plurality of independent video signals including at least image-representative analog signal components and line and field synchronizing signal components. Means are provided for supplying a switching signal representative of the occurrence of a desired frame interval having a duration substantially equal to twice the field interval associated with the video signals. An analog-to-digital video signal conversion means responsive to the independent video signals is arranged for converting the image-representative components associated with single field intervals to digital representations. First and second digital data storage means are provided and one of the data storage means is enabled during the desired frame interval to store digitized information representative of the single field interval while the other data storage means is enabled to read-out, twice in succession, digitized video signals representative of single field video signals occurring during a previous frame interval Identification encoding means are provided for adding, to the twice read-out video signals, identification information for distinguishing such read-out signals from others of the plurality of video signals.

DETAILED DESCRIPTION OF THE INVENTION

Figure 1:
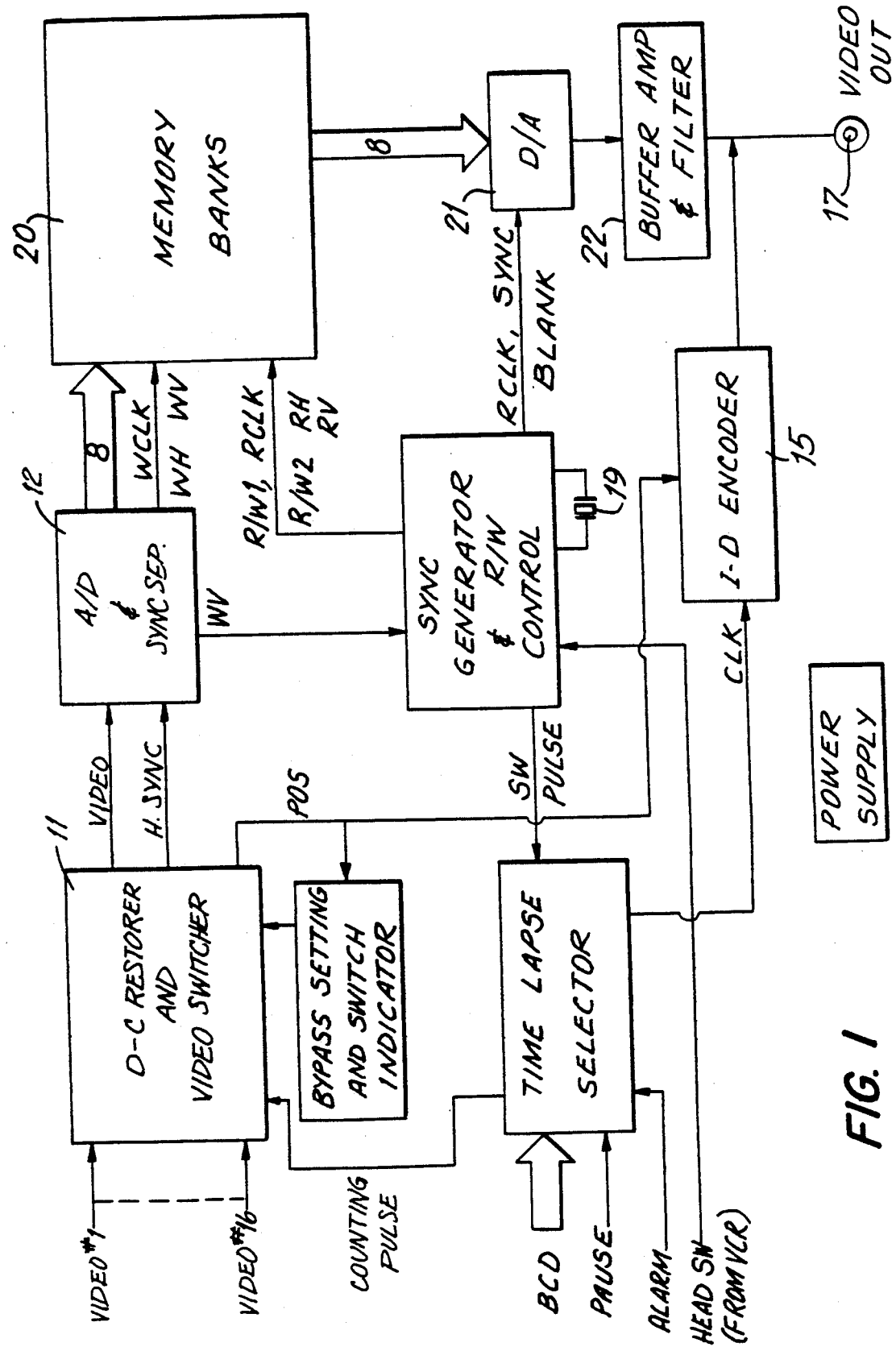
FIG. 1 illustrates, in block diagram form, an encoder for use in connection with a plurality of asynchronous image signal sources in accordance with the present invention.

Referring to FIG. 1, an asynchronous encoder constructed in accordance with the present invention is shown. The asynchronous encoder comprises a multiple (sixteen) input, d-c restorer and video switcher 11 which receives image-representative information from a plurality of sources (e.g. television cameras) and selectively amplifies and separates the video and horizontal synchronizing components from each of the sources (Video #1 through Video #16)in sequence. The separated video and "H Sync" components are coupled to a means for converting the analog video information to a digital representation of that same information, the converting means being shown as A/D converter 12. Video switcher 11 is arranged to step from one video source (e.g. Video #1) to the next (e.g. Video #2) in response to a counting or switching pulse provided by a time lapse selector circuit 13. Time lapse selector 13 produces such switching pulses to step video switcher 11 each time a predetermined number of frame intervals (e.g., 1/30th second) have occurred. The particular number of frame intervals is selected by an operator by means of a multi-digit control wheel (not shown) which provides a "BCD Switch" input to time lapse selector circuit 13.

Video switcher 11 also supplies four bit binary output (POS) data which identifies the particular one of the video sources to which it is connected. This four bit output data is coupled both to a bypass setting and switcher indicator 14 and to an identification encoder 15. The identification encoder 15 is also supplied with a clock or triggering pulse (CLK) from time lapse selector 13 to enable encoder 15 to insert video source identification information in binary form onto the back porch of the vertical synchronizing portion of a video output signal provided at video output terminal 17 (as will be explained more fully below).

With the exception of the A/D converter 12, the arrangement thus far described above is substantially the same as the system described in our above-identified earlier filed U.S. Patent Application Ser. No. 099,148.

In accordance with the present invention, in order to permit selection, identification and replay of video signals from any one of a plurality of asynchronous video signal sources, the encoder arrangement of FIG. 1 comprises the following additional elements.

A/D converter 12, in addition to converting incoming video signals from analog to digital form, as noted above, also provides "Write Vertical" (WV), "Write Horizontal" (WH) and "Write Clock" (WCLK) signals making use of an internal 12 Megahertz clock generator and the synchronizing signal components of the incoming video signals.

A crystal controlled, master synchronizing and read/write (R/W) control signal generator 18 is arranged to provide a plurality of switching pulses to the remainder of the system in response to the vertical synchronizing signals (WV) and in response to a VCR head switching (Head SW) pulse input provided from an associated video recorder (not shown).

The VCR head switching pulse (Head SW) recurs substantially at the nominal picture frame repetition rate (e.g., 30 Hertz) and serves to lock the sync generator 18 to the associated recorder (VCR) so as to obtain effective synchronous recording of the video signals supplied by the plurality of asynchronous signal sources (video #1 –video #16). This desired result is achieved by making use of the fact that regardless of the relative timing of the VCR head switching pulses and the vertical sync pulses associated with each video signal source, since the former occur at substantially one-half the rate of the latter, at least one full field of any of the scenes represented by the outputs from the video sources occurs between any two VCR head switching pulses. Furthermore, one full image frame can be produced on an image display device by reproducing a single field twice.

With the foregoing in mind, sync and control signal generator 18, under control of a reference crystal 19 which produces oscillations at, for example, 1.008 MHZ in an NTSC standard television signal environment, provides repetitive control signals identified as RCLK (READ CLOCK), RH (READ HORIZONTAL), RV (READ VERTICAL), W (WRITE), R/W (READ/WRITE), SYNC, BLANK and SW. PULSE. The signal SW PULSE is provided to time lapse selector circuit 13, recurs at the nominal frame rate (e.g., 30 Hertz) and is triggered by the Head SW switching pulse input from the associated VCR to sync generator 18. The previously noted counting or switching pulse output from selector circuit 13 to video switcher 11 occurs at a predetermined time delay after the SW PULSE. The delay is determined by the operator selected value associated with the input "BCD SWITCH" to selector circuit 13. For example, if BCD SWITCH (a binary coded decimal signal) is "002", the foregoing time delay between SW PULSE and the Counting Pulse input to switcher 11 will be equal to two picture fields interval or one-thirtieth second. In that case, video switcher 11 will step from one video source (camera) to the next every one-thirtieth second. It should be recognized that such switching or stepping may not be coincident with the vertical synchronizing interval of all of the video signal sources #1-16 since those sources are presupposed to be operating asynchronously However, as noted above, in every case, at least one full field (and one full vertical synchronizing interval) will occur during the 1/30th second interval (even though that field may be preceded and followed by partial fields). It is the full field which will be identified (tagged) and stored by the system in accordance with the present invention.

To that end, the switched video signal output from video switcher 11 is coupled along with horizontal synchronizing signals to A/D converter 12. Converter 12 is also arranged, as will be explained below, to include a "sync stripper". The analog video signals supplied to A/D converter 12 are sampled, for example, at a 12 Megahertz (MHZ) rate and are converted to 8-bit digital representations of the video (image) information. The 8-bit digital representations are coupled to memory banks 20 (such as conventional 256K by 1-bit solid state memory devices). The digitized video signals representative of a single field from the video source connected to switcher 11 are arranged in memory banks 20 under control of the WCLK (WRITE CLOCK), WH (WRITE HORIZONTAL) and WV (WRITE VERTICAL) signals. The foregoing "write" signals are in timed relation with the associated video signals.

The stored, digitized, single field, video signals subsequently are read from the memory banks 20, as will be explained more fully below, and are coupled to a digital to analog (D/A) converter 21 during the next succeeding frame interval in response to RCLK (READ CLOCK) signals provided by sync and control signal generator 18. BLANK (blanking) and SYNC signal components are also provided to D/A converter 21 to reconstruct a composite video signal. In accordance with one aspect of the present invention, the single field of digitized image information is read from memory banks 20 twice in succession in a single frame interval in timed relation with the head switching (HEAD SW) pulse supplied to sync generator 18. Video signals which are initially asynchronous relative to the associated VCR may thereby be rendered synchronous relative to each other and to the VCR.

Reconstructed full frame, analog video signals are coupled from D/A converter 21 to a filter and buffer amplifier 22 which is arranged to remove high frequency (above 6MHZ) digitizing noise from the applied video signals and to combine such filtered video signals with video source identification information provided by identification encoder 15.

As noted earlier, identification encoder 15 is provided with the 4-bit position data (POS) generated at video switcher 11. The 4-bit position (video source identification) data is converted to pulse form for insertion onto the back porch of the appropriate vertical synchronizing interval of the video signals produced at video output terminal 17.

In addition, information suitable for displaying the digital identification signals in alpha-numeric form on an associated monitor is inserted into the video signals by means of encoder 15.

Since, as noted above, the processing of the video signals by the A/D converter 12 and memory banks 20 requires that the video signal at the output of video switcher 11 be delayed so as to occur during a succeeding frame interval, the identification encoder 15 is arranged to provide the identification information at the delayed time interval. This result is achieved by supplying an appropriately delayed clock signal (DELAY CLK) within identification encoder 15 from the CLK signal supplied by time lapse selector 13.

With the foregoing general description in mind, a detailed description of the various major elements of the system of FIG. 1 will now be provided.

Figure 2:
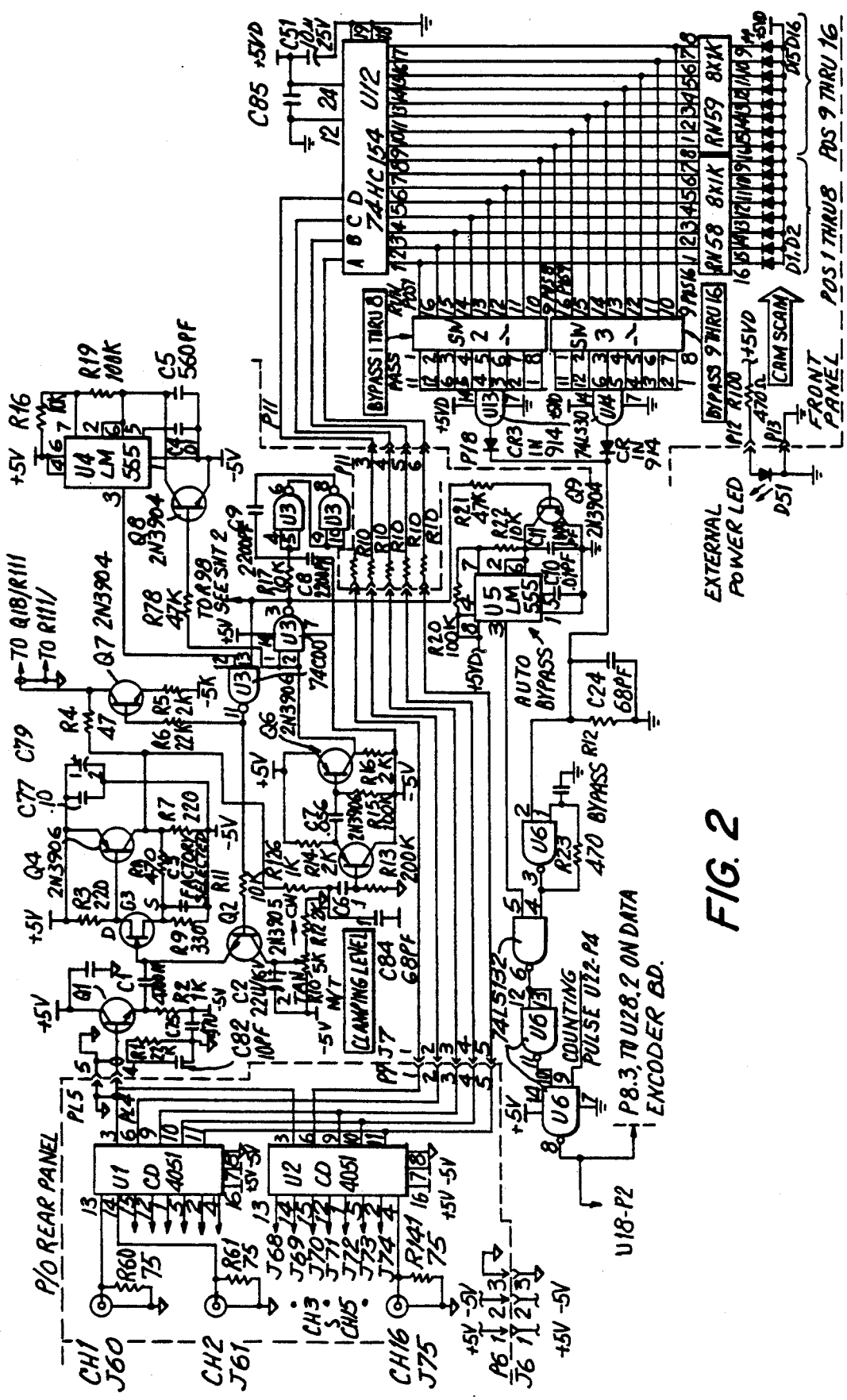
FIG. 2 is a detailed schematic circuit diagram of the D-C restorer and video switcher of FIG. 1.

Referring to FIG. 2, the D-C restorer and video switcher 11 of FIG. 1 is substantially similar in construction to the corresponding subsystem described in our above-referenced, earlier-filed application Ser. No. 099,148.

Aside from a few circuit component value changes, the major difference as compared to the arrangement in our earlier-filed application relates to the fact that the "VSYNC" output (vertical synchronizing signals derived from the incoming video signal) of the three stage circuit U3 is not employed in the present system. Alternative means, as will appear below, are provided for re-generating an appropriate vertical synchronizing signal in the present system.

Similarly to our earlier-filed application, means, including video input terminals labelled CH1 through CH16 (some of which are omitted for ease of understanding) are provided for selectively receiving composite video signals from a plurality of video sources (cameras). The video source input terminals CH1 through CH16 are scanned in sequence or may be bypassed under control of bypass setting switch banks S2 and S3 of bypass setting and switcher indicator 14. The signals from the video sources associated with each of the terminals CH1–CH16 which are to be monitored are connected through multiplexer circuits U1 or U2 (RCA integrated circuits Type CD 4051) for a predetermined time interval under control of a "Counting Pulse" supplied from the associated time lapse selector circuit 13 (FIG. 1) to a position counter U28 via a gate circuit U6. The bypass setting and switcher indicator system 14 provides for intentional bypassing of individual selected channels as determined by the setting of individual switches in the arrays S2 ("bypass 1 thru 8") and S3 ("bypass 9 thru 16") shown in FIG. 2. An "auto bypass" function is also provided by means of circuitry including a one-shot multivibrator integrated circuit U5. The "auto bypass" circuitry advances the multiplexers U1, U2 anytime there is an absence of horizontal synchronizing pulses (HSYNC) for three consecutive video line scanning periods at the composite video signal output of multiplexers U1, U2. Additional sequence controls (PAUSE and ALARM) are also provided as will be pointed out in connection with FIG. 5.

The selected composite video signal provided at the output terminal (pin 3) of multiplexers U1, U2 includes image-representative components along with horizontal (line) and vertical (field) synchronizing signal components. As position counter U28 steps through a programmed sequence, a 4-bit signal representing switcher position information (ABCD) is supplied to multiplexers U1 and U2 to enable the appropriate video signal input. The selected video signal appearing at pin 3 of multiplexers U1, U2 is "d-c restored" at the output of a video amplifier transistor Q1 by means of a clamping circuit including a transistor Q2. Horizontal synchronizing pulses ("HSYNC") are separated from the video signal by means of sync separator stages Q5, Q6. The separated HSYNC pulses or alternatively, pulses provided by a one-shot circuit U4, are applied to clamping transistor Q2 via a portion of a gating circuit U3 to cause transistor Q2 to conduct during the appropriate horizontal synchronizing interval as is known. The d-c restored video signals are amplified by transistors Q3, Q4 and the amplified, d-c restored video output is provided to A/D converter 12 (see FIGS. 1 and 3).

4-bit switcher position information (ABCD) is also supplied to a decoder U12 in the bypass setting and switcher indicator subsystem 14, as well as to the identification encoder 15 (see FIG. 8), as will be explained more fully below.

Figure 3:
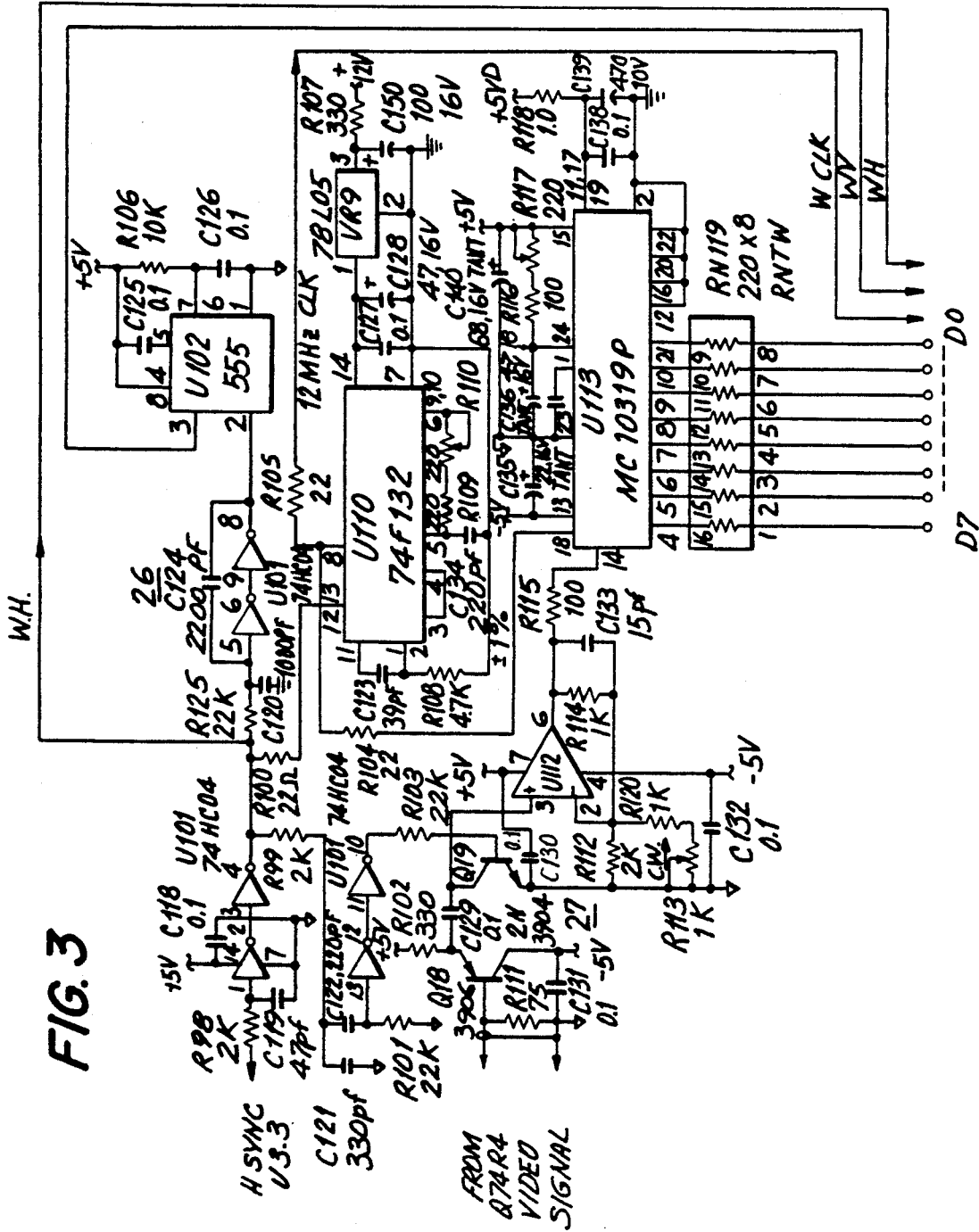
FIG. 3 illustrates, in detailed schematic circuit diagram form, the A/D converter and sync separator arrangement of FIG. 1.

Referring to FIG. 3, the HSYNC pulses provided at the output (pin 3) of stage U3 (FIG. 2) are coupled to appropriate wave-shaping amplifier stages U101 for generating WH (write horizontal) pulses. In addition, the vertical synchronizing pulse component of the HSYNC signal is separated and caused to produce a WV (write vertical) gating signal by means of an appropriate time constant circuit 26 and an associated one-shot vertical generator circuit U102. The WV gating signal occurs during the vertical synchronizing interval of the associated received video signal and is utilized to control, in part, the field storage memory banks 20 (FIG. 1) into which image information is written. The WV gating signals are utilized further to control generation of the W (write enable) signal by synchronizing and control signal generator 18 (FIG. 1). It has been found to be advantageous to re-generate the vertical synchronizing signal in the foregoing manner rather than by employing the arrangement of our above-noted earlier application in order to avoid possible stability problems when the vertical sync interval of the video signal is close in time to the occurrence of the associated VCR's head switching pulse.

The WH (horizontal rate) signals are also supplied to one input of a write clock (WCLK) generator, including an integrated circuit U110, which provides synchronous 12MHZ clock signals (at pin 8) for sampling the analog video signals to convert them to 8-bit digital form. The 12MHZ WLCK signals are supplied to an input (pin 18) of an analog-to-digital converter integrated circuit U113 (Type MC10319P) to effect that conversion.

The image representative portion of the video signals ("video from switcher 11") is supplied to an amplifier and clamping circuit 27. Horizontal synchronizing pulses (WH) are supplied to a clamping transistor Q19 coupled to an input (pin 3) of an amplifier circuit U112. The clamped and amplified analog video signal output of amplifier U112 is supplied to a video input terminal (pin 14) of A/D converter circuit U113.

Figure 6:
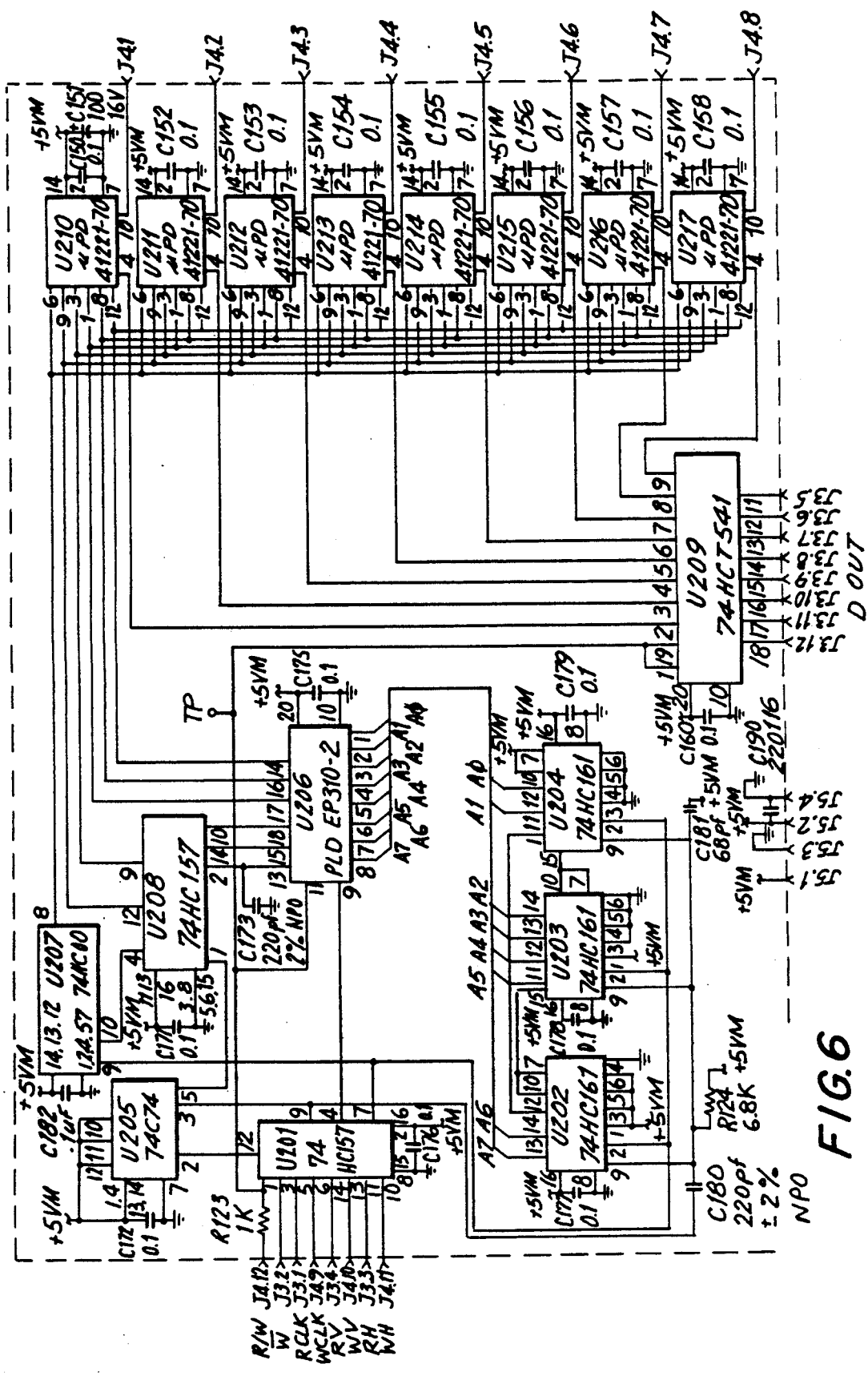
FIG. 6 illustrates, in detailed schematic circuit diagram form, one-half of the field storage memory banks arrangement of FIG. 1.

The analog video signals supplied to A/D converter U113 (at pin 14) are converted, under control of the 12MHZ clock signal (pin 18), to a sequence of 8-bit digital (binary) signals D0–D7 for storage in one-half of memory banks 20 (see FIG. 6).

Figure 4:
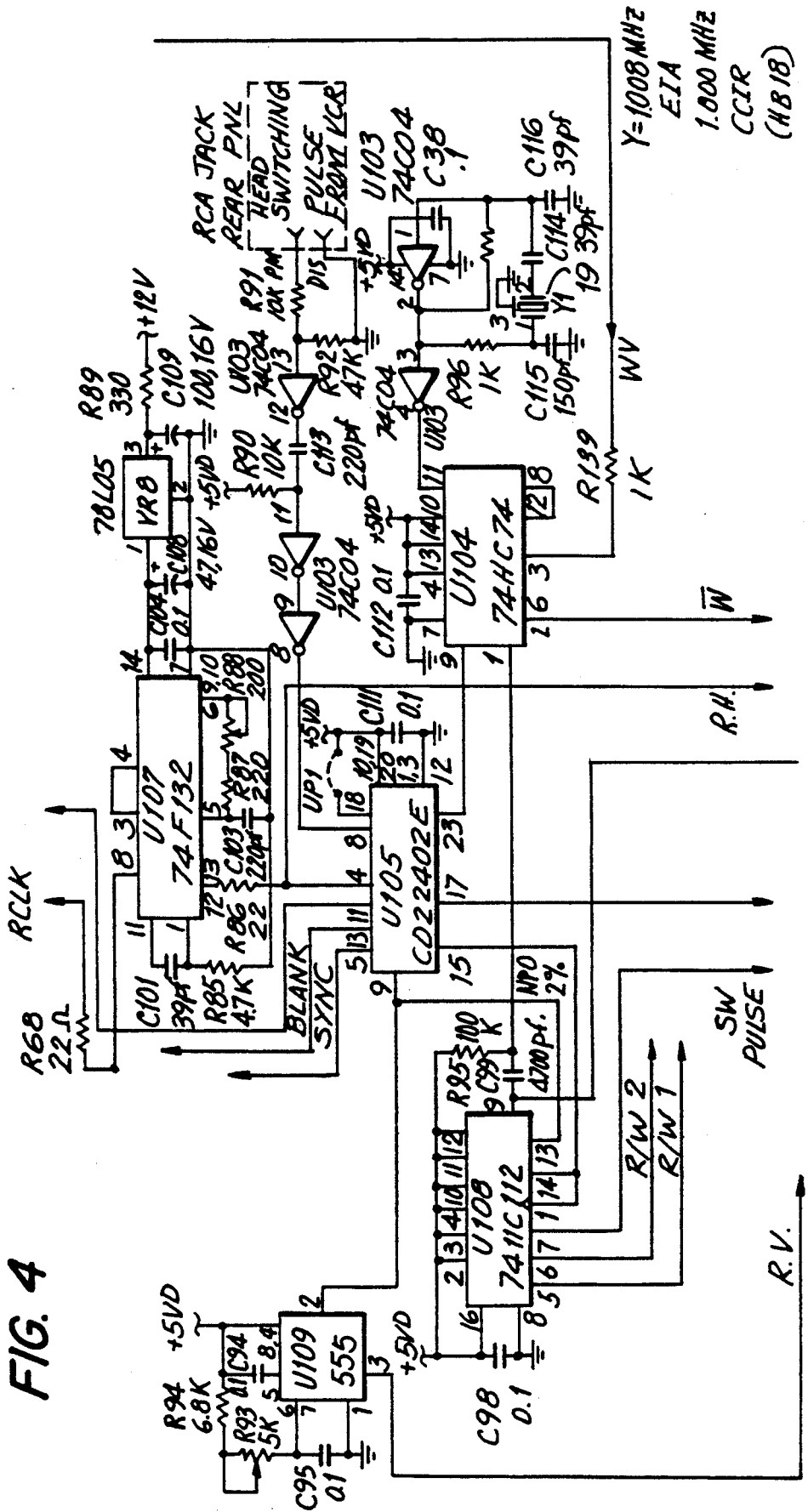
FIG. 4 illustrates, in detailed schematic circuit diagram form, the synchronizing and control signal generator arrangement of FIG. 1.

Referring now to FIG. 4, the synchronizing and control signal generator 18 of FIG. 1 is shown in detail. The sync signal generator 18 responds to a head switching pulse (HEAD SW) from an associated VCR, which is supplied via an amplifier 29 to produce a sequence of appropriate control signals (principally "read" control signals) so as to transform asynchronous video information into video information which is synchronous with respect to the VCR head switching signal and to signals derived from other cameras.

It should be noted that the "read" control signals are timed (synchronized) with respect to the HEAD SW (VCR head switching pulse) signal while the "write" control signals are timed (synchronized) with respect to the synchronizing signal components of an incoming video signal.

To that end, signal generator 18 (FIG. 4) employs an integrated circuit Sync generator U105 (RCA type CD22402E) which is reset each time a head switching pulse (HEAD SW) is supplied to pin 8. A crystal stabilized reference oscillator 28 is employed to provide a stable, continuous oscillatory output at a frequency of 1.008 MHZ for use in connection with NTSC standard television signals or at a frequency of 1.000 MHZ for use in connection with CCIR standard television signals. The output of the reference oscillator 28 (pin 4 of an integrated circuit amplifier U103) is coupled to one input of a dual D flip-flop circuit U104 which functions to divide the reference oscillator output frequency by two. The resulting 504KHZ reference waveform is supplied to sync generator circuit U105 to produce desired RH (pin 4), SYNC (pin 5), BLANK (pin 13), Frame Reset (pin 15), and Vertical Drive (pin 9) signals in timed relation to the HEAD SW pulse.

The RH (read horizontal) waveform, which recurs at the nominal television horizontal scanning frequency (e.g. 15,750 HZ), is devoid of any vertical interval (i.e. equalizing pulse) interruptions and is supplied to a temperature and voltage stabilized Schmitt trigger circuit including an integrated circuit U107 (similar to U110 FIG. 3) to produce RCLK signals at a 12 MHZ rate. The Schmitt trigger circuit will be referred to hereinafter as RCLK generator U107.

Synchronized field rate (e.g., 60 Hz) signals (RV), half-frame rate (e.g., 15 HZ) signals (R/W1 and R/W2), and a regenerated SW PULSE signal are also derived under control of sync generator 105.

The following timing descriptions are based on NTSC standard.

Specifically, a vertical drive 60 Hz pulse output (pin 9) of sync generator U105 is applied to a one-shot, multivibrator including an integrated circuit U109 to produce the RV (read vertical) output at 60 HZ. Circuit U109 may be adjusted by means of a potentiometer ("V center") to ensure that the read-out address matches that of the write signals, thereby preventing the appearance of random noise at the top or bottom of an associated display device.

The vertical drive output of sync generator U105 (pin 9) also is supplied to a frequency divider including an integrated circuit dual flip-flop U108 (at pin 13) to produce an output SW PULSE (a frame rate signal at pin 7) which is supplied to timed lapse selector circuit 13 (see FIGS. 1 and 5) in time relation with the HEAD SW pulse supplied to amplifier 29.

The divider including dual flip-flop circuit U108 also provides two complementary 15 HZ square waves (RW1 and RW2 at pins 5 and 6, respectively) for application to the field storage memory banks (FIG. 6) in response to FRAME RESET signals provided by Sync generator U105 at pin 15. Dual flip-flop circuit U108 also provides a differentiated frame reset pulse to a second flip-flop in dual flip-flop U104 via pin 1 of U104. That second flip-flop (associated with pins 1, 3, 6) is triggered by means of the next WV (write vertical ) or vertical synchronizing signal produced by A/D converter and sync separator 12. A W (write enable) signal (or its complement W) thus is provided at the output (pin 6) of the second flip-flop of circuit U104 to prepare the half of the field storage memory bank 20 into which image information is to be written.

Figure 5:
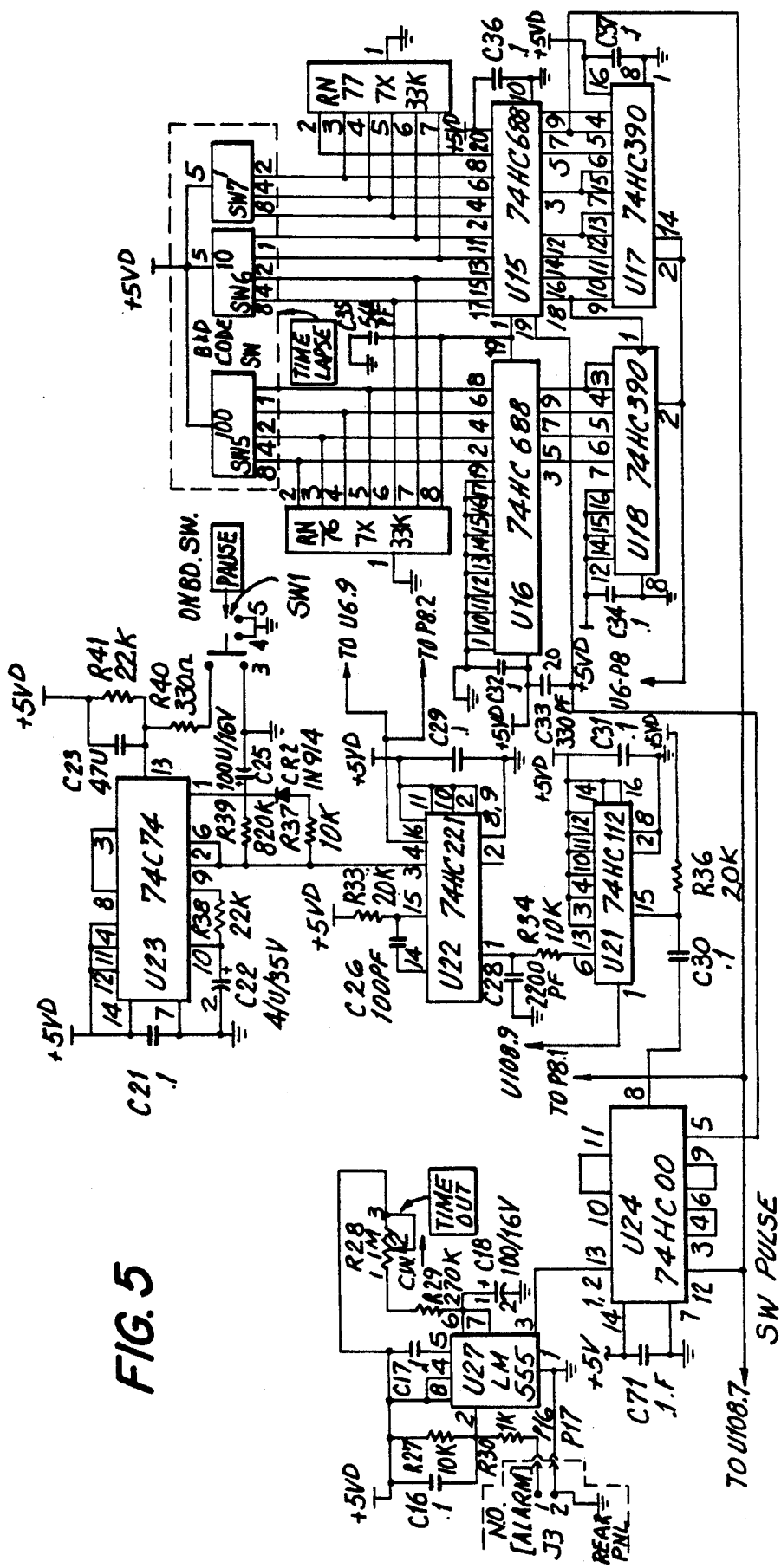
FIG. 5 is a detailed schematic circuit diagram of the time lapse selector of FIG. 1.

Referring now to FIG. 5, the time lapse selector circuit 13 of FIG. 1 will be described. The frame reference pulse SW PULSE derived from the VCR head switching pulse by synchronizing and control signal generator 18 (FIG. 4) is provided to an input terminal (pin 4) of cascaded interval counters U17, U18. Comparison circuits U15, U16 are coupled to counters U17, U18 and also to BCD code switches "100", "10" and "1" to provide a coincidence indication (at pin 19 of U15) whenever the number of frame rate pulses (SW PULSE) produced by flip-flop U108 is equal to the setting of the BCD code switches (i.e. the desired interval has occurred). The coincidence indication provided by circuit U15 is transferred by a portion of integrated logic circuit U24 (pins 5 & 8) for application to a reset terminal (pin 15) of an integrated circuit J-K flip-flop U21. The circuit U21 responds to the next FRAME RESET input to (pin 1) U21 from U108 in sync generator 18 to trigger a monostable multivibrator U22 (at pin 1) and produce a "counting pulse" (at pin 4 of U22). The counting pulse is applied to video switcher 11 (see FIG. 1 and pin 19 of circuit U6 in FIG. 2) to step switcher 11 to the next video source (CH1-CH16). The counters U17, U18 (FIG. 5) are also reset in response to the occurrence of the counting pulse (see input to pin 2 of U17 and U18).

Thus, the video switcher 11 is advanced from video source to video source (CH1-CH16) following an interval determined by the occurrence of the signal SW PULSE which occurs in timed relation with the switching of heads in an associated VCR and is independent of the vertical synchronizing intervals associated with the video sources (CH1-CH16).

The operation of multivibrator U22 may be disabled temporarily if a "Pause" button coupled to an integrated circuit U23 is depressed. U23 will automatically reset itself after a predetermined time delay or when the Pause button is again depressed.

Furthermore, if an "ALARM" is sensed by the system, the circuit associated with an oscillator U27 is activated and pulses are supplied to U24 (pin 13) to cause real time sequencing of plural video sources. In that case, the signal SW PULSE applied to U24 (pin 12) produces output pulses from U24 at a rate of 30$^{HZ}$ (at pin 8).

Referring now to FIG. 6, the field storage memory banks 20 of FIG. 1 will be described. The complete field storage memory bank 20 comprises two of the sets of circuit elements shown in FIG. 6. The only difference between the two halves of field storage memory banks 20 is that one is supplied with the one-half frame rate square wave R/W1 while the other is supplied with the complementary (opposite phase) one-half frame rate square wave R/W2 (see FIG. 4, outputs from UI08). The complementary square waves R/W1 and R/W2 serve to alternate the two halves of the field storage memory bank 20 between (1) storing asynchronous, digitized, single field video information and (2) reading out, twice in succession during a single frame interval, digitized single field video information stored during a preceding frame interval.

The operation of the field storage memory bank 20 serves to convert single field asynchronous video information from a plurality of separate sources to full frame, synchronous video information which is suitable for storage, retrieval and display using a single recorder and/or video display device.

Specifically, as is shown in FIG. 6, each half of field storage memory banks 20 comprises a memory array of eight devices. U210-U217 such as the NEC type UPD41221 integrated circuit. The combination of devices U210-U217 is capable of storing eight bit digitized video information representative of an image made up of 320 rows by 700 columns (224,000 pixels).

In the "write" mode of operation (i.e. when data is supplied) digitized video information is supplied on eight lines (D0-D7) from the A/D converter 12 (see, specifically, A/D converter U113 of FIG. 3) tO the memory devices U210-U217. Each of memory devices U210-U217 accepts a singe one of each eight bits.

A plurality of control signals including R/W (1 or 2), W, RCLK, WCLK, RV, WV, RH, and WH produced by sync generator 18 and A/D converter and sync separator 12 in the manner described above are supplied to a signal multiplexer U201.

Figure 10:
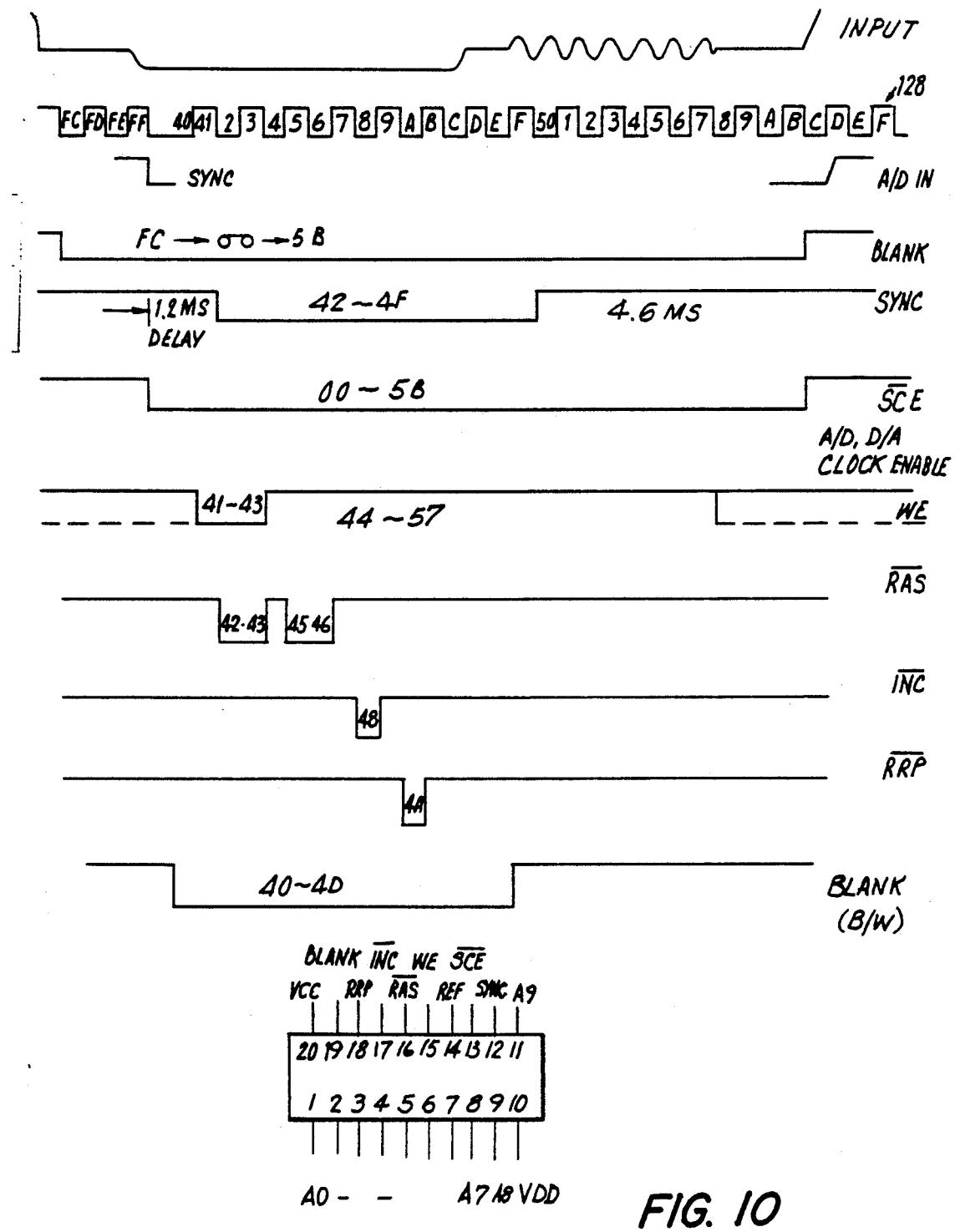
FIG. 10 is a waveform diagram related to the logic device U206 of FIG. 6.

The multiplexer U201, under control of the "write" portion of the applied R/W signal, selects the W (not write enable) signal and the three "write" control signals (WCLK, WV and WH) and couples such signals to control circuits within memory bank 20. Specifically, the WCLK signal appears at pin 7, the WV (vertical) signal appears at pin 12, the WH (horizontal) signal appears at pin 9 and the W (not write enable) signal appears at pin 4 of U201. The 12 MHz WCLK signals (pin 7) are coupled directly to a plurality of cascaded control counters U202, U203 and U204 and, also, via a NAND gate U207 to the clock input (pin 6) of the memory devices U210-U217. The cascaded control counters U202-U204 are also provided with differentiated horizontal rate signals (WH) as a reset signal. During each horizontal line interval (approximately 64 microseconds), the counters U202-U204 will advance sequentially from zero to a decimal count of 256 three times (a total count of 768). The resulting sequence of eight bit count outputs from counters U202-U204 are coupled to a programmed gate array logic device U206 which is arranged to produce six output sequences (at pins 13-18). The output sequences are illustrated in FIG. 10 along with certain system reference signals. The six output signals are identified as follows:

| Pin No. | Signal Symbol | Signal Description |
|---------|---------------|--------------------|
| 13 | SCE | Serial Clock Enable |
| 14 | REF | Refresh |
| 15 | WE | Write Enable |
| 16 | RAS | Row Address Stroke |
| 17 | INC | Increment to Next Row |
| 18 | RRP | Row Reset Pulse |

The logic device U206 is further conditioned by applying the read/write (RW) signal to a control input (pin 11) and by applying the Write Enable (WE) signal to a second control input (pin 9).

The refresh clock (REF) provided at pin 14 of logic device U206 is not shown in FIG. 10 since it has been found to be advantageous to disable that function during the write operation in order to reduce the generation of undesired noise in memory devices U210-U217.

The three signal output lines corresponding to REF, RAS and INC are coupled directly from the outputs of logic device U206 to corresponding inputs of each of the memory devices U210-U217. The three remaining signal output lines SCE, WE and RRP are coupled to a multiplexer circuit U208. Multiplexer U208 is conditioned (at pin 1) by means of a vertical rate signal derived by means of a flip-flop U205 to which vertical (WV) signals and horizontal (WH) signals are supplied from multiplexer U201. Flip-flop U205 produces a clean vertical rate signal which is synchronized with respect to horizontal rate (WH) signals.

A row counter reset pulse (RRP) provided from logic device U206 (at pin 18) is passed through multiplexer U208 (pin 10 in and pin 9 out) during the vertical interval determined by U205 to a row counter reset input terminal (pin 3) of each of the memory devices U210-U217.

The WE (write enable) signal is similarly coupled to devices U210-U217. The SCE (series clock enable) signal is also passed through multiplexer U208 to an input (pin 15) of a NAND gate U207 to permit the WCLK signal (U201 pin 7) to arrive at the clock input (pin 6) of each of the memory devices U210U217. The digitized eight bit, single field video information provided at the data input terminals of memory devices U210-U217 from A/D converter U113 is thereby clocked into the memory during a frame interval as described above.

In the succeeding frame interval, the 15 Hz read/write waveforms (R/W 1 and R/W 2) "turn over" and cause the memory system described above to be changed over from a "write" condition to a "read" condition. At the same time, the second memory circuit arrangement (not shown) of the type illustrated in FIG. 6, to which the oppositely phased R/W signal is supplied, switches to a "write" condition. In that next frame interval, the writing (or storing) memory arrangement operates as described above but with respect to a different field of video information (e.g. either from another source or a field of information from the next frame produced by the same source as in the preceding case). The memory arrangement of FIG. 6, on the other hand, is switched over to the "read" condition by the applied R/W signal.

It should also be noted that a tri-state buffer data register U209 is coupled to the data output lines of the memory device array U210-U217 and is also provided with the R/W control waveform. The R/W control waveform conditions register U209 during the "write" operation so as to provide a neutral data output condition to subsequent circuitry in the D/A converter 21 (see below). Changes occurring at the data input lines to register U209 as a result of changes in the data being written into devices U210-U217 are therefore isolated within the memory bank 20 and are not passed to subsequent circuits during the "write interval" (a frame interval determined by the VCR head switching pulses).

When the applied R/W signal changes state, thereby signalling a change from the "write" mode to the "read" mode for the particular half of memory bank 20, the corresponding "read" signals RCLK, RV and RH are coupled by multiplexer U201 to condition circuits within memory bank 20 for reading out digitized video information stored during the previous frame interval.

Figure 7:
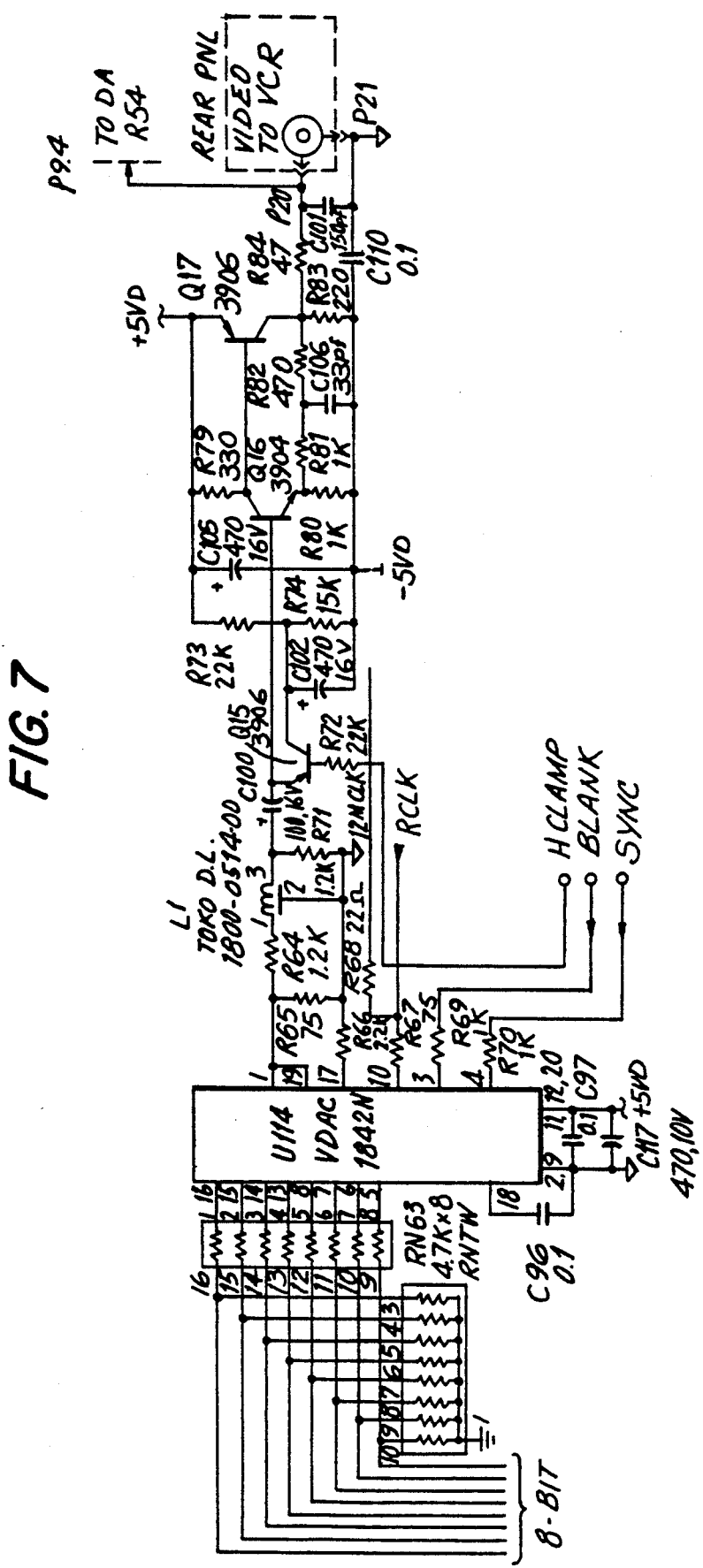
FIG. 7 illustrates, in detailed schematic circuit diagram form, the D/A converter and video output amplifier of FIG. 1.

Specifically, the tri-state buffer data register U209 is conditioned by the R/W waveform to pass the output state of the data lines of memory devices U210-U217 in sequence to D/A converter 21 (FIG. 7).

In fact, the memory devices U210-U217 are read in synchronism with the occurrence of the VCR HEAD SW signal since, as is described in connection with FIG. 4 above, the RCLK, RV and RH signals are so synchronized. Furthermore, the same digital representations of video signals are read out twice in succession during a single frame interval by virtue of the fact that the sequencing of the system of FIG. 6 is restarted (reset) each time an RV (read vertical) signal change occurs. That change occurs at the beginning of each field or twice each frame. The memory devices U210-U217 are therefore re-read during the second half of each frame when that half memory 20 is in the "read" condition. The memory devices U210-U217 are, as is customary, refreshed during the "read" mode of operation and half of "write" period while $\overline{WE}$ is "high" therefore the data is retained substantially without diminution. The twice read out, digitized single field video signals are coupled sequentially from data register U209 (FIG. 6) to a like number of input terminals (eight) associated with a digital to analog (D/A) converter integrated circuit U114 (see FIG. 7). In addition, the synchronized 12MHZ RCLK (read clock) output of RCLOCK GENERATOR U107 (FIG. 4) is supplied to an appropriate input terminal (pin 10) of an Intech Type VDAC 1842 integrated circuit of D/A converter U114. A SYNC (synchronizing) signal component and a BLANK (banking) signal component generated by sync signal generator U105 (FIG. 4) are also supplied to appropriate input terminals (pins 4 and 3, respectively) of D/A converter U114. The sequentially applied digitized video signals are converted to analog form at an analog video output terminal (pins 1, 19) of U114. High frequency digitizing noise in the analog video signal is removed by means of a low pass filter (cut frequency of 6MHZ) which is illustrated as including a video delay line L1 and associated resistors (R64, R71). The filtered video signal is clamped to an appropriate d-c level by means of a clamping circuit including a transistor Q15 to which horizontal synchronizing signals are supplied from sync generator U105 (pin 11). The clamped video signals are amplified by a two stage video amplifier (Q16, Q17) and are coupled to a video output terminal 17 ("VIDEO to VCR"). In addition to the clamped video signals, appropriate four bit camera identification information and corresponding numerical video information generated by identification encoder 15 (see description of FIG. 8 below) are also added at the "VIDEO to VCR" output terminal 17.

Figure 8:
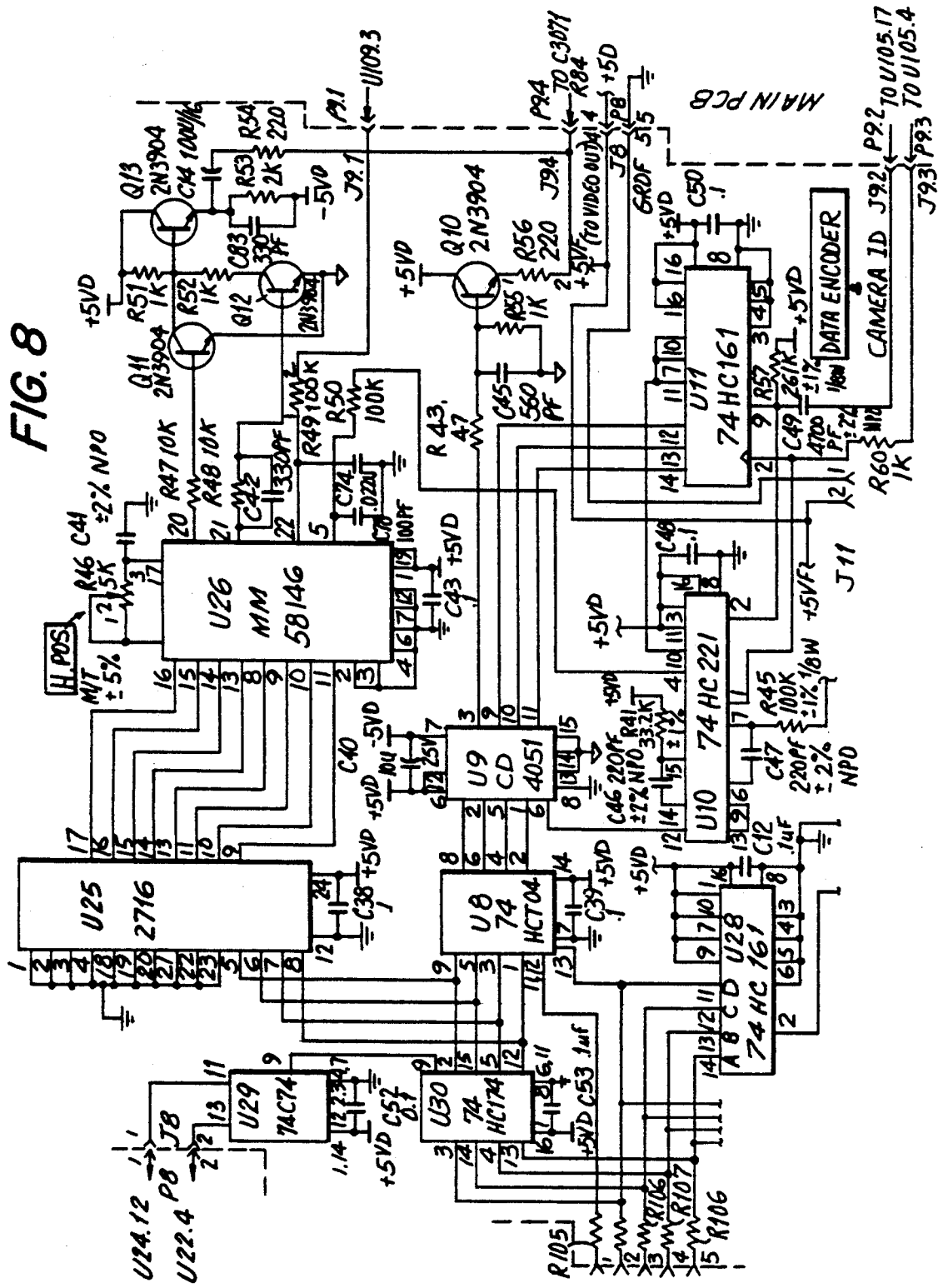
FIG. 8 is a detailed schematic circuit diagram of the identification encoder of FIG. 1.

Referring to FIG. 8, the identification encoder is substantially similar to the identification encoder described in our earlier-filed application referred to above. That is, the 4-bit video source identification information (ABCD) is inserted onto the back porch of the vertical synchronizing interval of the associated video signal. In addition, a character generator U25, U26 converts this digital identification information to generate corresponding alphanumeric character information for insertion into the output video signal. However, since the video signal appearing at the video output terminal 17 has been delayed by one frame interval in the processing described above, the camera (video source) identification information which is added to the video output signals (at 17) must correspond to the video signal of that earlier interval. A four bit data latch U30 (a plurality of flip-flops) is therefore provided to store the four bit identification information (ABCD) provided by counter circuit U28. Transfer of the outputs from the data latch U30 to the following character and pulse generating circuits is controlled by means of a delay clock generator U29 (D flip-flop) which is arranged to delay the application of camera identification information to the video output terminal 17 by a time equal to one frame interval. Delay clock generator U29 is supplied (at pin 11) with the signal SW PULSE (a frame rate pulse signal timed with respect to the VCR head switching interval) from circuit U108 (FIG. 4). Furthermore, delay clock generator U29 is supplied (at pin 13) with the signal COUNTING PULSE (indicating that the video source CH1-CH16 is being switched) from circuit U22 (pin 4). The delay clock generator U29 is switched by the COUNTING PULSE and, subsequently, on application of the next SW PULSE(one frame later) provides a switching signal (at pin 9) to data latch U30. The four bit identification information (ABCD) in then made available both to pulse generating circuitry U8-U11 and to character generator circuitry U25-U26. In this way, the four bit video source identification information is delayed for one frame interval until the matching video (image) information is available at the output of the memory bank devices U210–U217. Specifically, the circuit U8 is a signal inverter. A four bit counter U11 is enabled by a vertical synchronizing signal provided by sync generator U105 (FIG. 3). Counter U11 provides a three bit output (count of 8) to a pulse generator U9. A pulse generator U10 provides a gating signal corresponding to the desired pulse interval during the backporch period of vertical sync. The timed output of generator U10 is applied to pulse generator U9 which, under control of the 3 bit output of U11, produces the desired sequence of binary pulses corresponding to the camera identification to an output emitter follower transistor Q10. At the same time, circuits U25 and U26 form a character generator for superimposing an alphanumeric representation of the binary coded data onto the output video signal in a conventional manner.

Figure 9:
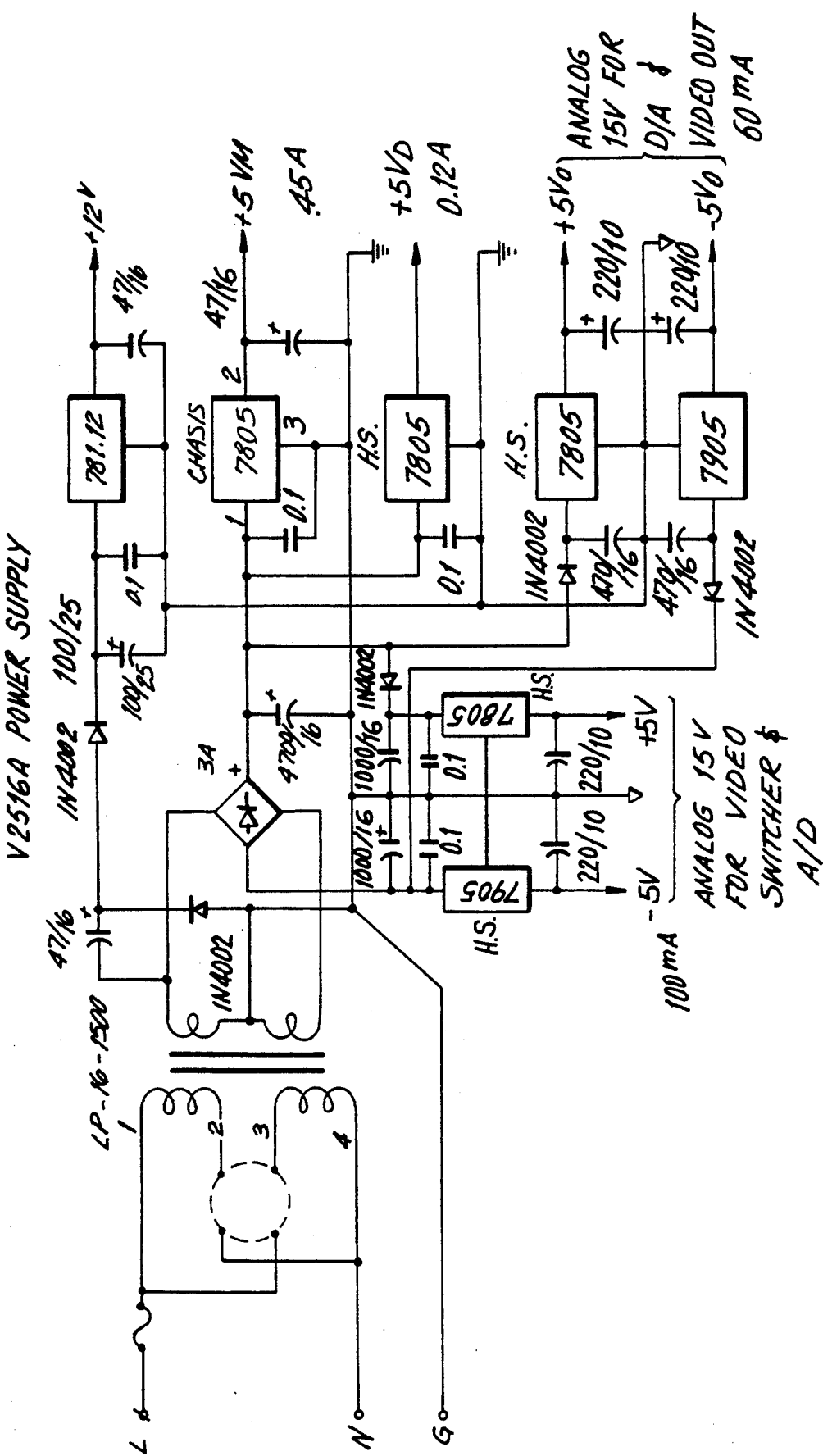
FIG. 9 is a detailed schematic circuit diagram of a power supply suitable for use in connection with the apparatus of FIG. 1.

Referring to FIG. 9, a power supply arrangement for supplying the various voltages utilized in the system is illustrated. While the design of such power supply is readily within the skill of regular workers in the art, its details are shown in schematic form to illustrate one operative arrangement.

The illustrated circuit arrangement makes use of a plurality of integrated circuits which are identified by standard type designations and are available from numerous commercial sources. Many of the types are available from Texas Instruments. A few more specialized circuits have been identified along with their suppliers in the foregoing text.

| Integral Circuit | Commercial Type No. | FIG. |
|---|---|---|
| U1 | CD4051 | FIG. 2 |
| U2 | CD4051 | " |
| U3 | 74C00 | " |
| U4 | LM555 | " |
| U5 | LM555 | " |
| U6 | 74LS132 | " |
| U8 | 74HCT04 | FIG. 4 |
| U9 | CD4051 | " |
| U10 | 74HC221 | " |
| U11 | 74HC161 | " |
| U12 | 74HC154 | FIG. 2 |
| U13 | 74LS30 | " |
| U14 | 74LS30 | " |
| U15 | 74HC688 | FIG. 3 |
| U16 | 74HC688 | " |
| U17 | 74HC390 | " |
| U18 | 74HC390 | " |
| U19 | 74HC157 | " |
| U20 | 74HC153 | " |
| U21 | 74HC112 | " |
| U22 | 74HC221 | " |
| U23 | 74C74 | " |
| U24 | 74C04 | " |
| U25 | 2716 | FIG. 4 |
| U26 | MM58146 | " |
| U27 | LM555 | FIG. 3 |
| U28 | 74HC161 | FIG. 2 |
| U29 | 74C74 | FIG. 4 |
| U30 | 74HC174 | " |
| U101 | 74HC04 | FIG. 5 |
| U102 | LM555 | " |
| U103 | 74C04 | FIG. 6 |
| U104 | 74HC74 | " |
| U105 | CD22402E | " |
| U106 | 78L05 | " |
| U107 | 74F132 | " |
| U108 | 74HC112 | " |
| U109 | LM555 | " |
| U110 | 74F132 | FIG. 5 |
| U111 | 78L05 | " |
| U112 | LM318 | " |
| U113 | MC10319P | " |

| Integral Circuit | Commercial Type No. | FIG. |
|---|---|---|
| U114 | VDAC 1842D | FIG. 8 |
| U201 | 74HC157 | FIG. 7 |
| U202 | 74HC161 | " |
| U203 | " | " |
| U204 | " | " |
| U205 | 74C74 | " |
| U206 | EP310-02 PLD | " |
| U207 | 74HC00 | " |
| U208 | 74HC157 | " |
| U209 | 74HCT541 | " |
| U210–217 | UPD41221-70 | " |

While the foregoing description is directed to particular circuit arrangements suitable for practicing the invention, it should readily be recognized that various modifications may be made without departing from the scope of the present invention which is set forth in the following claims.

What is claimed is:

1. Apparatus for encoding identification information for multiple asynchronous video signal sources comprising:
   switching means for supplying in sequence a plurality of independent video signals, each from one of said sources and including at least image-representative signal components and line and field synchronizing signal components;
   analog to digital video signal conversion means responsive to said independent video signals for converting said image-representative signal components associated with single field intervals to digital representations thereof;
   first and second digital data storage means, each having a storage capacity at least sufficient to store digitized information representative of said a single field interval of video signals;
   means for supplying a gating signal representative of the occurrence of a desired frame interval having a duration substantially equal to twice the field interval associated with said video signals;
   means for enabling one of said data storage means during said desired frame interval to store said digitized information representative of said single field interval in said one data storage means and for enabling the other of said data storage means to read out twice in succession digitized video signals representative of video signals occurring during a previous frame interval; and
   encoding means for adding, to said video signals which are read out twice in succession, identification information for distinguishing said last-named video signals from others of said plurality of independent video signals.

2. Apparatus according to claim 1 for encoding identification information for multiple asynchronous video signal sources wherein:
   said analog to digital video signal conversion means is arranged for converting said image-representative signal components associated with a single field interval to digital representations thereof during a first frame interval; and
   said means for enabling enables one of said data storage means during said first frame interval and enables the other of said data storage means to read out twice in succession during said first frame interval digitized video signals representative of video signals occurring during a previous frame interval.

3. Apparatus according to claim 1 wherein said one of said data storage means is enabled to store single field digitized information from one of said video signal sources and then to read out twice in succession said stored digitized information from one of said video signal sources; and said other of said data storage means is enabled to store single field digitized information from another of said video signal sources, and then to read out twice in succession said stored digitized information from said other of said video signal sources; and said encoding means adds to respective ones of said video signals which are read out twice in succession, separate identification information corresponding to said one and said other video signal source.

4. Apparatus according to claim 3 wherein said switching means further comprises counting means for providing identification information corresponding to the one of said sources from which said switching means is supplying signals at any given time; and said encoding means adds appropriate representations of said identification information to said video signals which are read out twice in succession.

5. Apparatus according to claim 4 wherein said encoding means further comprises delay means for receiving identification information during a first frame interval and for adding said identification information to said video signals during the succeeding frame interval.

6. Apparatus according to claim 5 and further comprising:

digital to analog signal conversion means coupled to said data storage means for converting said twice read out digitized video signals to full frame analog video signals.

7. Apparatus according to claim 6 wherein said means for supplying a gating signal comprises a synchronizing signal generator system responsive to external frame rate pulses for providing synchronized high frequency reading clock signals, horizontal rate signals, frame rate signals, field rate signals and half field rate signals to said data storage means for reading out video information synchronously with said frame rate pulses.

8. Apparatus according to claim 7 wherein said analog to digital video signal conversion means comprises synchronizing signal separator means for deriving line synchronizing and field synchronizing information from said video signals;

said analog to digital signal conversion means further comprising a high frequency writing clock signal generator responsive to said derived line synchronizing information for storing said digitized video information in said data storage means.

9. Apparatus according to claim 1 wherein said means for supplying a gating signal comprises a synchronizing signal generator system responsive to external frame rate pulses for providing synchronized high frequency reading clock signals, horizontal rate signals, frame rate signals, field rate signals and half field rate signals to said data storage means for reading out video information synchronously with said frame rate pulses; and said analog to digital video signal conversion means comprises synchronizing signal separator means for deriving line synchronizing and field synchronizing information from said video signals;

said analog to digital signal conversion means further comprising a high frequency writing clock signal generator responsive to said derived line synchronizing information for storing said digitized video information in said data storage means;

10. Apparatus for encoding identification information for multiple asynchronous video signal sources comprising:

switching means for supplying in sequence a plurality of independent video signals, each from one of said sources and including at least image-representative signal components and line and field synchronizing signal components;

analog to digital video signal conversion means responsive to said independent video signals for converting said image-representative signal components associated with single field intervals to digital representations thereof;

first and second digital data storage means, each having a storage capacity at least sufficient to store digitized information representative of a single field interval of video signals;

means for supplying a gating signal representative of the occurrence of a desired frame interval having a duration substantially equal to twice the field interval associated with said video signals;

means responsive to said gating signal for enabling said first and second data storage means alternately during succeeding frame intervals to store digitized information representative of a single field interval and to read out twice in succession digitized single field video signals representative of video signals occurring during a previous frame interval; and encoding means for adding, to said video signals which are read out twice in succession, identification information for distinguishing said last-named video signals from others of said plurality of independent video signals.

11. Apparatus according to claim 10 for encoding identification information for multiple asynchronous video signal sources wherein:

said analog to digital video signal conversion means is arranged for converting said image-representative signal components associated with a single field interval to digital representations thereof during a first frame interval; and said means for enabling enables one of said data storage means during said first frame interval and enables the other of said data storage means to read out twice in succession during said first frame interval digitized video signals representative of video signals occurring during a previous frame interval.

12. Apparatus according to claim 10 wherein one of said data storage means is enabled to store single field digitized information from one of said video signal sources and then to read out twice in succession said stored digitized information from one of said video signal sources; and the other of said data storage means is enabled to store single field digitized information from another of said video signal sources, and then to read out twice in succession said stored digitized information from said other of said video signal sources; and said encoding means adds to respective ones of said video signals which are read out twice in succession, separate identification information corresponding to said one and said other video signal source.

13. Apparatus according to claim 10 wherein said one of said data storage means is enabled to store single field digitized information from one of said video signal sources and then to read out twice in succession said stored digitized information from one of said video signal sources; and said other of said data storage means is enabled to store single field digitized information from another of said video signal sources, and then to read out twice in succession said stored digitized information from said other of said video signal sources; and said encoding means adds to respective ones of said video signals which are read out twice in succession, said identification information corresponding to said one and said other video signal source.

14. Apparatus according to claim 13 wherein said switching means further comprises counting means for providing identification information corresponding to the one of said sources from which said switching means is supplying signals at any given time; and said encoding means adds appropriate representations of said identification information to said video signals which are read out twice in succession.

15. Apparatus according to claim 14 wherein said encoding means further comprises delay means for receiving identification information during a first frame interval and for adding said identification information to said video signals during the succeeding frame interval.

16. Apparatus according to claim 15 and further comprising:

digital to analog signal conversion means coupled to said data storage means for converting said twice read out digitized video signals to full frame analog video signals.

17. Apparatus according to claim 16 wherein said means for supplying a gating signal comprises a synchronizing signal generator system responsive to external frame rate pulses for providing synchronized high frequency reading clock signals, horizontal rate signals, frame rate signals, field rate signals and half field rate signals to said data storage means for reading out video information synchronously with said frame rate pulses.

18. Apparatus according to claim 17 wherein said analog to digital video signal conversion means comprises synchronizing signal separator means for deriving line synchronizing and field synchronizing information from said video signals;

said analog to digital signal conversion means further comprising a high frequency writing clock signal generator responsive to said derived line synchronizing information for storing said digitized video information in said data storage means.

19. Apparatus according to claim 20 wherein said means for supplying a gating signal comprises a synchronizing signal generator system responsive to external frame rate pulses for providing synchronized high frequency reading clock signals, horizontal rate signals, frame rate signals, field rate signals and half field rate signals to said data storage means for reading out video information synchronously with said frame rate pulses; and said analog to digital video signal conversion means comprises synchronizing signal separator means for deriving line synchronizing and field synchronizing information from said video signals.

said analog to digital signal conversion means further comprising a high frequency writing clock signal generator responsive to said derived line synchronizing information for storing said digitized video information in said data storage means.

20. Apparatus for encoding identification information for multiple video signal sources comprising:

switching means for supplying in sequence a plurality of independent video signals, each from one of said sources and including at least image-representative signal components and line and field synchronizing signal components;

means for providing separate identification information for signals from each of said sources;

analog to digital signal conversion means responsive to said independent video signals for converting said image-representative signals to digital representations thereof;

first and second digital data storage means, each having a storage capacity at least sufficient to store digitized information representative of a single field interval of video signals;

means for supplying a gating signal independent of said video signals and representative of the occurrence of a desired frame interval having a duration substantially equal to twice the field interval associates with said video signals;

means responsive to said gating signal for enabling one of said data storage means during said desired frame interval to store digitized information representative of a single field interval, for enabling said one data storage means during a succeeding frame interval to read out twice in succession said stored digitized information and for enabling the other of said data storage means during said succeeding frame interval and a subsequent frame interval to store and then read out twice in succession digitized video signals representative of image information occurring during said succeeding frame interval; and encoding means for adding, to respective ones of said video signals which are read out twice in succession, said separate identification information for distinguishing individual ones of said plurality of video signals from each other.

21. Apparatus according to claim 20 for encoding identification information for multiple video signal sources wherein:

said analog to digital video signal conversion means is arranged for converting said image-representative signal components associated with a single field interval to digital representations thereof during a first frame interval; and said means for enabling enables one of said data storage means during said first frame interval and enables the other of said data storage means to read out twice in succession during said first frame interval digitized video signals representative of video signals occurring during a previous frame interval.

22. Apparatus according to claim 20 wherein said one of said data storage means is enabled to store single field digitized information from one of said video signal sources and then to read out twice in succession said stored digitized information from one of said video signal sources; and said other of said data storage means is enabled to store single field digitized information from another of said video signal sources, and then to read out twice' in succession said stored digitized information from said other of said video signal sources; and said encoding means adds to respective ones of said video signals which are read out twice in succession, said separate identification information corresponding to said one and said other video signal source.

23. Apparatus according to claim 20 wherein said one of said data storage means is enabled to store single field digitized information from one of said video signal sources and then to read out twice in succession said stored digitized information from one of said video signal sources; and said other of said data storage means is enabled to store single field digitized information from another of said video signal sources, and then to read out twice in succession said stored digitized information from said other of said video signal sources; and said encoding means adds to respective ones of said video signals which are read out twice in succession, said identification information corresponding to said one and said other video signal source.

24. Apparatus according to claim 23 wherein said switching means further comprises counting means for providing identification information corresponding to the one of said sources from which said switching means is supplying signals at any given time; and said encoding means adds appropriate representations of said identification information to said video signals which are read out twice in succession.

25. Apparatus according to claim 24 wherein said encoding means further comprises delay means for receiving identification information during a first frame interval and for adding said identification information to said video signals during the succeeding frame interval.

26. Apparatus according to claim 25 and further comprising:

digital to analog signal conversion means coupled to said data storage means for converting said twice read out digitized video signals to full frame analog video signals.

27. Apparatus according to claim 26 wherein said means for supplying a gating signal comprises a synchronizing signal generator system responsive to external frame rate pulses for providing synchronized high frequency reading clock signals, horizontal rate signals, frame rate signals, field rate signals and half field rate signals to said data storage means for reading out video information synchronously with said frame rate pulses.

28. Apparatus according to claim 27 wherein said analog to digital video signal conversion means comprised synchronizing signal separator means for deriving line synchronizing and field synchronizing information from said video signals;

said analog to digital signal conversion means further comprising a high frequency writing clock signal generator responsive to said derived line synchronizing information for storing said digitized video information in said data storage means.

29. Apparatus according to claim 20 wherein said means for supplying a gating signal comprises a synchronizing signal generator system responsive to external frame rate pulses for providing synchronized high frequency reading clock signals, horizontal rate signals, frame rate signals, field rate signals and half field rate signals to said data storage means for reading out video information synchronously with said frame rate pulses; and said analog to digital video signal conversion means comprises synchronizing signal separator means for deriving line synchronizing and field synchronizing information from said video signals.

said analog to digital signal conversion means further comprising a high frequency writing clock signal generator responsive to said derived line synchronizing information for storing said digitized video information in said data storage means.

30. Method of encoding identification information for multiple asynchronous video signal sources comprising:

supplying in sequence a plurality of independent video signals, each from a different source, and including at least image-representative signal components and line and field synchronizing signal components;

supplying a timing signal representative of the occurrence of a desired frame interval having a duration substantially equal to twice the field interval associated with said video signals;

converting said image-representative signal components associated with a single field interval to digital representations thereof;

storing said digitized information representative of said single field interval in a first data storage means;

reading out from a second data storage means, twice in succession during said desired frame interval, digitized video signals representative of video signals occurring during a previous frame interval; and adding, to said video signals which are read out twice in succession, identification information for distinguishing said last-named video signals from others of said plurality of independent video signals.

31. Method of encoding identification information for multiple asynchronous video signal sources according to claim 30 wherein:

said steps of converting said image-representative signal components associated with a single field interval to digital representations occurs during a first frame interval; and said step of reading out from a second data storage means, twice in succession, digitized video signals representative of video signals occurring during a previous frame interval occurs during said first frame interval.

32. Method of encoding identification information for multiple video signal sources comprising:

supplying in sequence a plurality of independent video signals, each from a different source, and including at least image-representative signal components and line and field synchronizing signal components;

supplying timing signals representative of the occurrence of desired frame intervals having a duration substantially equal to twice the field interval associated with said video signals;

converting said image-representative signal components associated with single field intervals to digital representations thereof;

storing said digitized information representative of a first of said single field intervals in a first data storage means during a first one of said desired frame intervals;

reading out from said first data storage means, twice in succession during a next successive desired frame interval, said digitized information representative of single field interval video signals;

storing, in a second data storage means during said next successive desired frame interval, digitized information representative of a second of said field intervals;

reading out from said second data storage means, twice in succession, during a subsequent desired frame interval, said second field interval digitized signals; and adding to said video signals which are read out twice in succession, identification information for distinguishing said video signals from others of said plurality of independent video signals.

* * * * *